United States Patent Office 3,575,913
Patented Apr. 20, 1971

3,575,913
STABLE LATEX FOR PAPER COATING COMPOSITIONS
Gary L. Meier, Midland, Mich., assignor to The Dow Chemical Company, Midland, Mich.
No Drawing. Filed Apr. 8, 1968, Ser. No. 719,731
Int. Cl. B32b 29/06; C08d 3/06; C08f 15/40
U.S. Cl. 260—29.7
14 Claims

ABSTRACT OF THE DISCLOSURE

A latex having improved pigment stability for use in paper coating is prepared by a process for emulsion polymerization of ethylenically unsaturated monomers, in which process a monoethylenically unsaturated dicarboxylic acid is fed initially to a reaction zone, the preponderant proportion of the monomeric composition, comprising an alkenyl aromatic monomer such as styrene and a conjugated diene such as 1,3-butadiene, is fed to the reactor, preferably in a continuous manner, and polymerization is carried out by free-radical producing means such as an inorganic persulfate catalyst until at least about 90 percent conversion of the monomers and then from about 1 percent to about 5 percent, based on the total weight of the monomeric composition, of an acrylic acid is added and polymerized at a temperature of from about 70° C. to about 100° C., preferably from about 90° C. to about 95° C. preferably also with the concurrent or subsequent addition of from about 0.1 to about 0.6 percent by weight of an inorganic persulfate catalyst, the percentage being based on the total monomer weight.

BACKGROUND OF THE INVENTION (1) Field of the invention

This invention relates to an improved process for aqueous emulsion polymerization to produce latexes especially adapted for paper coating.

(2) Description of the prior art

Paper coating compositions comprise pigments such as clay and an adhesive material (or binder) which very often, in the present state of the art, contains or consists of a synthetic latex. Latexes of copolymers of styrene and 1,3-butadiene have been widely used for this purpose for a considerable period of time and more recently latexes of copolymers of styrene, 1,3-butadiene and one or more ethylenically unsaturated carboxylic acids have been developed. Very often, starch, and/or casein and/ or other natural binders have been used together with such a latex as the binder component of a coating color. Many problems in the paper industry result from the presence of coagulum or excessive viscosities of the coating formulations or coating colors. It would be highly desirable, therefore, to have a latex which, when formulated with a variety of pigments and with or without starch as a cobinder, would remain stable to a combination of polyvalent ions, heat and mechanical shear.

SUMMARY OF THE INVENTION

The present invention is an emulsion polymerization process and the product of that process in which a monomeric composition comprising a monovinylidene aromatic monomer and an acyclic conjugated diene is polymerized in aqueous media by free-radical producing means, in which process the novel and critical features are in combination:

(1) initially feeding to a reaction zone, from about 0.5 percent to about 2.5 percent by weight, based on the total weight of the monomeric composition of a monoethylenically unsaturated dicarboxylic acid, and (2) after polymerization of at least about 90 percent of the previously added monomeric composition, adding from about 1 percent to about 5 percent by weight, based on the total weight of the monomeric composition, of an acrylic acid, and optionally, but preferably from about 0.1 percent to about 0.6 percent by weight, based on the total weight of the monomeric composition, of an inorganic persulfate catalyst and continuing the polymerization at a temperature of from about 70° C. to about 100° C.; preferably from about 90° C. to about 95° C. The latex product obtained by the process is especially adapted to, and has desirable properties for, the preparation of coating colors for use in coating paper. Especially to be noted are the stability to pigment and pigment/starch combinations as shown by resistance to coagulation and resistance to undesirable increases in viscosity.

DETAILED DESCRIPTION OF THE INVENTION

The process of this invention requires as monomeric starting material (1) an acidic monomer to be added initially (2) a monomeric composition to provide the predominant part of the copolymer comprising the latex and (3) an acidic monomer to be added after at least about 90 percent conversion of the previously added monomers.

The acidic monomer to be added initially consists of the monoethylenically unsaturated dicarboxylic acids such as itaconic acid, fumaric acid, maleic acid, citraconic acid, mesaconic acid and glutaconic acid.

The acidic monomer which is added as a "shot," i.e., after at least about 90 percent conversion, consists of an acrylic acid, i.e., acrylic acid per se and alpha-substituted acrylic acids, particularly those acids in which the alpha substituent has from one to four carbon atoms. Examples of such acids are acrylic acid, methacrylic acid, ethacrylic acid, alpha-n-propyl acrylic acid, alpha-n-butyl acrylic acid and the like.

The predominant portion of the monomers, i.e., the monomers other than the initially added acidic monomer and the finally added acidic monomer, consists essentially of a mixture of at least one monovinylidene aromatic monomer and at least one acyclic conjugated diene, optionally with small amounts of other emulsion polymerizable ethylenically unsaturated monomers. The preferred compositions include a hydroxyalkyl ester.

The monovinylidene aromatic compounds are represented by styrene, substituted styrenes (e.g., styrene having halogen, alkoxy, cyano or alkyl substituents), vinyl naphthalene and the like. Specific examples are styrene, α-methylstyrene, ar-methylstyrene, ar-ethylstyrene, α,ar-dimethylstyrene, ar,ar-dimethylstyrene, ar-t-butylstyrene, methoxystyrene, cyanostyrene, acetylstyrene, monochlorostyrene, dichlorostyrenes, other halostyrenes and vinyl-naphthalene.

In these specifications and claims, by the word "monovinylidene" in the term "monovinylidene aromatic" monomer or compound is meant that to an aromatic ring in each molecule of the monomer or compound is attached one radical of the formula,

wherein R is hydrogen or a lower alkyl such as an alkyl having from 1 to 4 carbon atoms, e.g., methyl, ethyl, n-propyl, n-butyl and isobutyl.

The acyclic conjugated dienes operable in the practice of this invention include butadiene and substituted butadiene and other acyclic compounds having at least two sites of ethylenic unsaturation separated from each other by a single carbon-to-carbon bond. Specific examples are 2-methyl - 1,3 - butadiene, 2,3-dimethyl - 1,3 - butadiene, piperylene, 2-neopentyl - 1,3 - butadiene, and other hydrocarbon homologs of 1,3-butadiene, and, in addition, the substituted dienes, such as 2-chloro - 1,3 - butadiene, 2-cyano - 1,3 - butadiene, the substituted straight-chain conjugated pentadienes, the straight and branch-chain hexadienes, and others. The 1,3-butadiene hydrocarbons and 1,3-butadiene specifically, because of their ability to produce particularly desirable polymeric materials, are preferred comonomers for use with the monovinylidene aromatic monomer.

Usually the acyclic conjugated diene component is used in an amount from about 227 percent to about 45 percent by weight, based on the total weight of monomers.

Small amounts of other ethylenically unsaturated neutral monomers may be copolymerized with the above prescribed monomers for use in the practice of this invention. Typical such other monomers are chloro-substituted aliphatic monoethylenically unsaturated monomers such as vinyl chloride and vinylidene chloride; the acrylonitriles such as acrylonitrile and methacrylonitrile; the alkyl esters of an acrylic acid in which the alkyl portion has from 1 to 12 carbon atoms, such as methyl acrylate, methyl methacrylate, ethyl acrylate, ethyl methacrylate, n-propyl acrylate, n-propyl methacrylate, isopropyl acrylate, isopropyl methacrylate, n-butyl acrylate, n-butyl methacrylate, isobutyl acrylate, isobutyl methacrylate, 2-ethylhexyl acrylate, 2-ethylhexyl methacrylate, n-octyl acrylate, n-octyl methacrylate, n-decyl methacrylate, and dodecyl methacrylate; ethylenically unsaturated esters of saturated carboxylic acids such as vinyl acetate and vinyl propionate; the ethylenically unsaturated ketones such as methyl isopropenyl ketone, and the like.

Especially advantageous products are obtained when such additional neutral monomer is a hydroxyalkyl ester of an $\alpha,\beta$-ethylenically unsaturated aliphatic carboxylic acid.

The hydroxyl-containing esters of $\alpha,\beta$-ethylenically unsaturated aliphatic monocarboxylic acids advantageously are esters of acrylic acid and alpha-substituted acrylic acids (such as alpha-lower-alkyl substituted acids, especially methacrylic acid), all of which esters have a monohydroxy substituent in the alcohol moiety of the ester. In the hydroxyl-containing esters there are at least two carbon atoms in the chain between the hydroxyl group and any other oxygen atom. Representatives of such esters are $\beta$-hydroxyethyl acrylate, $\beta$-hydroxypropyl acrylate, $\beta$-hydroxyethyl methacrylate, $\beta$-hydroxypropyl methacrylate, 4 - hydroxybutyl acrylate, 4 - hydroxybutyl methacrylate and 5 - hydroxyamyl methacrylate. In addition to the above represenative hydroxyl-containing esters, there may also be used other similar esters of alpha-alkyl substituted acrylic acids in which the alpha-alkyl substituent has from 2 to 4 carbon atoms, or more, e.g., ethyl, propyl, n-butyl, and isobutyl. Thus, the radical attached to the alpha-carbon of the acrylic acid moiety of the hydroxyl-containing ester may be hydrogen or an alkyl having from 1 to 4, or more, carbon atoms.

The process of this invention is an emulsion polymerization method carried out batchwise or preferably semicontinuously. A monoethylenically unsaturated di-carboxylic acid monomer, as previously defined, in an amount of from about 0.5 percent to about 2.5 percent, preferably from about 0.8 percent to about 1.5 percent, by weight based on the total monomer weight, is introduced into the reaction zone initially. The predominant portion of the monomers, i.e., the neutral monomers are then introduced batchwise or in numerous small increments or preferably continuously. After at least 90 percent conversion, preferably from about 94 percent to about 99 percent, of the thus added monomers, an acrylic acid is added in an amount of from about 1 percent to about 5 percent, based on the total monomer weight.

In the case where the predominate portion of the monomers is added continuously, the addition of the acrylic acid monomer occurs at a period of at least about 1 hour after completion of the feeding of the continuous monomer stream. Polymerization ordinarily is continued after the acrylic acid shot until at least about 98 percent total conversion.

The emulsion polymerization process is carried out in aqueous media using free-radical means, especially free-radical producing catalysts, usually in an amount from 0.01 percent to about 3 percent, based on the weight of the monomers, at an acid pH and preferably with a chain transfer agent and often with an emulsifier. The free-radical producing catalysts conveniently are peroxygen compounds especially the inorganic persulfate compounds such as sodium persulfate, potassium persulfate, ammonium persulfate; the peroxides such as hydrogen peroxide; the organic hydroperoxides, for example cumene hydroperoxide and t-butyl hydroperoxide; the organic peroxides, for example, benzoyl peroxide, acetyl peroxide, lauroyl peroxide, peracetic acid, and perbenzoic acid—sometimes activated by a water-soluble reducing agent such as a ferrous compound or sodium bisulfite—and other free-radical producing materials such as 2,2'-azobisisobutyronitrile.

Often at least one anionic emulsifier is included in the polymerization charge. Representative types are the alkali metal alkyl aryl sulfonates, the alkali metal alkyl sulfates, the sulfonated alkyl esters, and the like. Specific examples of these well-known emulsifiers, for the purpose of illustration and not for limitation, are dodecylbenzene sodium sulfonate, sodium di-secondary-butyl naphthalene sulfonate, sodium lauryl sulfate, disodium dodecyl diphenyl ether disulfonate, N-octadecyl disodium sulfosuccinamate and dioctyl sodium sulfosuccinate. Other specific examples are given in the annual editions of Detergents and Emulsifiers, John W. McCutcheon, Inc., Morristown, N.J., e.g., "1963 Annual."

Optionally other ingredients well-known in the emulsion polymerization art may be included such as accelerators, chelating agents, buffering agents, redox agents, inorganic salts, thickeners, chain transfer agents and pH adjusting agents.

In the preparation of the present latexes, the polymerization temperature should be above 50° C. and preferably should fall in the range of from 70° C. to 100° C. The use of lower temperatures gives rise to longer polymerization cycles. Higher temperatures than about 100° C. present difficulties in the polymerization due to the increased pressure of volatile ingredients, such as butadiene. If temperatures below 70° C. are used for the main proportion of the polymerization, the temperature must be raised to and maintained within the range of from about 70° C. to about 100° C., preferably from about 90° C. to about 95° C., when the final "shot" of an acrylic acid is added and polymerized. Greatly to be preferred is the addition approximately concurrently with the acrylic acid monomer of from about 0.1 percent to about 0.6 percent of a persulfate catalyst, e.g., sodium persulfate, potassium persulfate and ammonium persulfate.

It is convenient to conduct the polymerization at autogenous pressure but that is not a requirement.

The pH of the aqueous medium is usually maintained during polymerization at a value from about 1.5 to about 7, but preferably from about 2.5 to about 5.

Whether the process is a semicontinuous method in which the initial dicarboxylic acid monomer, and the final shot of an acrylic acid are fed batchwise and the balance of the monomers, i.e., the non-acid monomers, are fed to the reaction zone in a continuous manner, or whether the non-acid monomers are also added batchwise, it is sometimes preferred after the initial addition of the dicarboxylic acid monomer, to polymerize therewith a small portion of the non-acid monomers before addition, batchwise or preferably continuously, of the predominant portion of the non-acid monomers.

The latex products, as prepared, usually have a polymeric solids content above about 40 percent by weight, typically from about 48 percent to about 65 percent.

In the subsequent examples, the Satin White Stability Test, the Calcium Carbonate/Starch Stability Test and the English China Clay/Starch Stability Test were carried out according to the following description:

The Satin White Stability Test is carried out by placing in a Waring Blendor at ambient temperature a quantity of the latex and a sufficient quantity of an aqueous dispersion of Satin White at 30 percent solids concentration to provide 2 parts of Satin White for each part of the latex, each calculated on a solids basis, and then mixing until coagulation occurs. Results are recorded according to the time required to cause coagulation.

In the calcium carbonate/starch test an aqueous dispersion is prepared according to the following recipe:

|  | Weight (dry basis) parts |
|---|---|
| No. 2 Kaolin clay ᵃ | 60 |
| Calcium carbonate ᵃ | 40 |
| Latex | 5 |
| Starch | 10 |

ᵃ Predispersed in water with 0.4 part of sodium pyrophosphate.

The total solids of the aqueous dispersion is adjusted to 55 percent solids, based on the total weight of the composition, and the pH to a value within the range of 9 to 9.5. The Brookfield viscosity (using No. 4 spindle at 20 r.p.m.) is measured initially and after 16 hours.

In the English China Clay/Starch Test an aqueous dispersion is prepared according to the following recipe:

|  | Weight (dry basis) parts |
|---|---|
| English china clay ᵃ | 100 |
| Latex | 5 |
| Starch | 10 |

ᵃ Predispersed in water with 0.4 part of tetrasodium pyrophosphate.

The solids content of the aqueous dispersion is adjusted to 55 percent, based on the total weight of the composition and the pH to a value of from 9 to 9.5. The Brookfield viscosity (using No. 4 spindle at 20 r.p.m.) is measured initially and after 16 hours.

The following examples are given to illustrate more clearly the principle and practice of this invention to those skilled in the art and are not for the purpose of limitation. Throughout this specification and claims, all parts and percentages are by weight unless otherwise indicated.

Examples 1–5

In Example 1, to a reactor at 30° C. was charged 62.8 parts of water, 1.0 part of itaconic acid, 0.1 part of sodium persulfate, 0.4 part of sodium hydroxide, 0.05 part of a 30 percent aqueous solution of sodium lauryl sulfate, and 127 parts per million of the pentasodium salt of diethylenetriamine pentaacetic acid. The free space in the reactor then was purged by the use of nitrogen and reduced pressure. After the contents of the reactor were heated to 50° C., 6 parts of styrene, 4 parts of butadiene and 0.5 part of carbon tetrachloride were added, the entire reactor contents were agitated and the temperature was raised to, and maintained at, 90° C. until the pressure had dropped 6 pounds per square inch. A previously prepared aqueous solution consisting of 20 parts of water, 0.9 part of sodium persulfate, 0.95 part of a 30 percent aqueous solution of sodium lauryl sulfate and 53 parts per million of the pentasodium salt of diethylene triamine pentaacetic acid was added in a continuous manner over a period of six hours. Starting at the same time as the aqueous stream there was also fed in a continuous manner to the reactor over a period of five hours a solution of 55.5 parts of styrene, 2.5 parts of carbon tetrachloride, 29 parts of butadiene and a premixed solution of 3 parts of β-hydroxyethyl acrylate in 2 parts of methanol. One hour after the last of the continuously added monomers were introduced into the reactor, there were added 1.5 parts of acrylic acid in 1.6 parts of water. Fifteen minutes later, a solution of 0.1 part of sodium persulfate in 2 parts of water was added. After further agitation at temperatures of 90° C. for two hours the reactor contents were allowed to cool. A latex product was obtained having an average particle size of about 2000 Angstroms, a pH of 3.6 and a solids content of 49.7 percent. Results of the Satin White Stability Test, the Calcium Carbonate/Starch Test, and the English China Clay/Starch Test are included in Table I.

Other latex compositions were prepared in substantially the same manner as described for Example 1 except for variations in the amount of the initially added dicarboxylic acid monomer and/or the timing and amount of the finally added carboxylic acid monomer. These variations and the test results are shown in Table I.

Shown also in Table I are comparative compositions which are not examples of the invention. Compositions A and B (not examples of the invention) conform to the requirement of the invention except that the shot of an acrylic acid was added immediately after the last of the other monomers were added. In composition C there was no final acrylic acid shot.

In each of Examples 1–5, the conversion of monomers to polymer was at least 90 percent completed at the time the acrylic acid was added.

TABLE I

| | Initial itaconic acid, parts | Finally added carboxylic monomer | | Satin white stability, minutes | Calcium carbonate/ starch stability, viscosity | | E.C. clay/starch stability, viscosity | |
|---|---|---|---|---|---|---|---|---|
| | | Acrylic acid, parts | Delay time, hrs. | | Initial | 16 hours | Initial | 16 hours |
| Ex. No.: | | | | | | | | |
| 1 | 1 | 1.5 | 1 | >30 | 2,500 | 3,250 | 2,200 | 3,900 |
| 2 | 1 | 1.5 | 2 | >30 | 3,350 | 3,360 | 2,250 | 3,750 |
| 3 | 1 | 1.25 | 2 | >30 | 2,600 | 2,900 | 2,340 | 3,800 |
| 4 | 2 | 1.5 | 2 | >30 | 4,420 | 9,380 | 2,680 | 6,150 |
| 5 | 1 | 4.5 | 1 | >30 | 3,200 | 3,100 | 4,150 | 4,025 |
| A ¹ | 1 | 1.5 | 0 | 20 | 3,300 | 3,400 | 2,500 | 8,500 |
| B ¹ | 1 | 1 | 0 | 19 | 3,330 | 3,450 | 2,370 | 17,200 |
| C ¹ | 2 | 0 | 0 | 1 | 8,700 | >10,000 | 3,075 | 6,150 |

¹ Not examples of the invention.

From Table I it is readily apparent that the Satin White Stability is significantly better for Examples 1–5 than for comparative compositions A, B and C.

In the Calcium Carbonate/Starch Test, the Brookfield viscosity (under the conditions described above) desirably is not greater than about 4000 either initially or after 16 hours. In the English China Clay/Starch Test, the Brookfield viscosity (under the conditions described above) desirably is not greater than about 5000 either initially or after 16 hours. In both tests there should not be a large increase in viscosity from the initial test to the 16-hour test.

From Table I it can be seen that Eaxmples 1, 2, 3 and 5 (which are within the preferred scope of the invention) meet all the desired requirements for pigment stability.

Example 4 (which is within the operable scope of the invention but is outside the preferred scope) is comparable in Satin White Stability to the other examples and is significantly better than materials A, B and C but is slightly deficient in meeting the preferred characteristics in the Calcium Carbonate/Starch Test and in the English China Clay/Starch Test.

Comparative material A is deficient in Satin White Stability and English China Clay/Starch Stability; comparative material B is deficient in Satin White Stability and English China/Starch Stability; but comparative material C is deficient according to all of the tests.

That which is claimed is:

1. In a method for preparation of a latex by emulsion polymerization in a reaction zone at a polymerization temperature of from about 50° C. to about 100° C. by free-radical producing means of a monomeric composition comprising a monovinylidene aromatic monomer and an acyclic conjugated diene, the improvement of using in combination the steps of
   (A) feeding initially into the reaction zone from about 0.5 percent to about 2.5 percent, based on the total weight of the monomeric composition, of a monoethylenically unsaturated dicarboxylic acid
   (B) feeding into the reaction zone a predominant portion of the monomeric composition, which portion consists essentially of the monovinylidene aromatic monomer and the acyclic conjugated diene
   (C) polymerizing the thus added monomers to at least about 90 percent conversion, and
   (D) thereafter feeding into the reaction zone from about 1 percent to about 5 percent, based on the total weight of the monomeric composition, of an acrylic acid and continuing polymerization at a temperature from about 70° C. to about 100° C. to a total conversion of at least about 98 percent by weight.

2. The method of claim 1 in which the unsaturated dicarboxylic acid is used in an amount of from about 0.8 percent to about 1.5 percent.

3. The method of claim 1 in which the acrylic acid is added at from about 94 percent to about 99 percent conversion.

4. The method of claim 1 in which the dicarboxylic acid is itaconic acid.

5. The method of claim 1 in which the acrylic acid is acrylic acid.

6. The method of claim 1 in which from about 0.1 percent to about 0.6 percent by weight of an inorganic persulfate is added during step (D).

7. The method of claim 1 in which the monovinylidene aromatic monomer is styrene and the acyclic conjugated diene is 1,3-butadiene.

8. The method of claim 1 in which the polymerization in step (C) is carried out at a temperature of from about 70° C. to about 100° C.

9. The method of claim 1 in which the polymerization temperature in step (D) is from about 90° C. to about 95° C.

10. A latex prepared by the method of claim 1.

11. The method of claim 1 in which the acyclic conjugated diene is used in an amount of from about 27 percent to about 45 percent, based on the total weight of the monomeric composition.

12. The method of claim 1 in which the monomeric composition includes a hydroxyl-containing ester of an $\alpha,\beta$-ethylenically unsaturated aliphatic monocarboxylic acid.

13. The method of claim 12 in which the hydroxyl-containing ester is $\beta$-hydroxyethyl acrylate.

14. The method of claim 1 in which a small proportion of the monomeric composition of step (B) is copolymerized before the major proportion for that step is fed to the reaction zone.

References Cited

UNITED STATES PATENTS

| | | | |
|---|---|---|---|
| 2,967,174 | 1/1961 | Bartl | 260—78.5 |
| 3,256,234 | 6/1966 | Miller | 260—78.5 |
| 3,267,061 | 8/1966 | Senior et al. | 260—78.5 |
| 3,429,952 | 2/1969 | Nordsiek et al. | 260—879 |
| 3,444,121 | 5/1969 | Altier et al. | 260—78.5 |
| 3,471,591 | 10/1969 | Lindsey | 260—879 |

JULIUS FROME, Primary Examiner

A. H. KOECKERT, Assistant Examiner

U.S. Cl. X.R.

117—148; 260—78.5, 879